May 23, 1933. W. L. CLOUSE 1,910,090
NUT GUIDE FOR TAPPING MACHINES
Filed Nov. 10, 1930
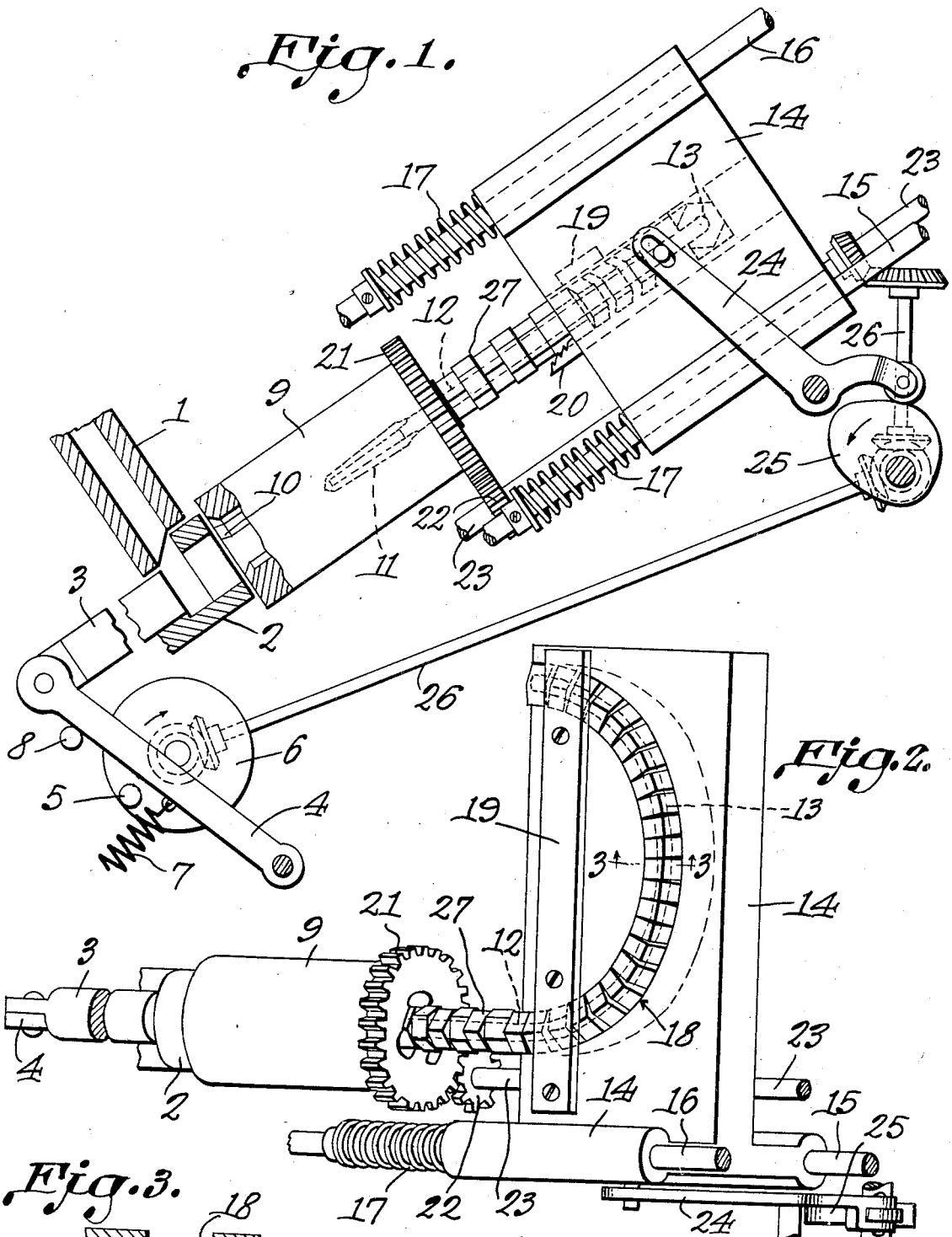

Patented May 23, 1933

1,910,090

UNITED STATES PATENT OFFICE

WILLIAM L. CLOUSE, OF TIFFIN, OHIO, ASSIGNOR TO THE NATIONAL MACHINERY COMPANY, OF TIFFIN, OHIO

NUT GUIDE FOR TAPPING MACHINES

Application filed November 10, 1930. Serial No. 494,785.

This invention relates to nut guides for tapping machines.

Many machines for threading nuts (known generally as tapping machines) utilize a tap having a stem on which the nuts are pushed as fast as they are tapped. It has been found most practicable heretofore to mount the tap for rotation so as to thread a nut which is held against rotation and cause it to move on the stem of the tap. This stem has been curved laterally and the finished nuts have been thrown therefrom by centrifugal force, striking an enclosing housing and producing excessive marking of the nuts.

Other disadvantages have been present in a machine of this type making it desirable to provide a machine utilizing a non-rotatable tap in co-operation with a rotatable nut holder or sleeve. However, difficulty has been experienced in delivering the nuts from the stem of the tap. It is essential that the stem be curved laterally to dischage the nuts from one side of the mechanism, but it is also necessary to relieve it of the excessive weight of the nuts accumulated thereon and to equalize the contact between the nuts and the tap stem. Otherwise an excessive drag is set up by the nuts on the tap stem, the nut threads tend to distort, and the tapping operation meets with undesirable resistance.

In an effort to overcome these defects I have extended the tap stem into a tubular guide for receiving the nuts. It has been found in practice, however, that the nuts will rotate to different relative positions and that numerous corners of angular nuts will be presented to and bite into the wall of a guide of this type, thereby seriously interfering with the tapping and delivering operations.

It is an object of the present invention to provide a guide in which tapped nuts can be slidably mounted without rotating independently about their individual axes and without dragging on the stem of the tap.

It is a further object to provide a means for directing the nuts into their guide so that their bottom portions will all occupy the same plane and none of the nuts will become hung or caught so as to interfere with the operation of the machine.

A further object is to provide a placer at the inlet of the guide to insure proper placement of the nuts as they enter the guide after leaving the rotatable nut holder or sleeve.

With the foregoing and other objects in view which will appear as the description proceeds, the invention resides in the combination and arrangement of parts and the details of construction hereinafter described and claimed, it being understood that changes in the precise embodiment of the invention may be made within the scope of what is claimed without departing from the spirit of the invention.

In the accompanying drawing the preferred form of the invention has been shown.

In said drawing

Figure 1 is a view partly in side elevation and partly in section illustrating the mechanism.

Figure 2 is a plan view.

Figure 3 is an enlarged section on line 3—3, Figure 2.

Referring to the figures by characters of reference, 1 designates a feed chute from which nut blanks are supplied to a guide sleeve 2 in which a plunger 3 is mounted. This plunger can be actuated by any suitable means. For example a lever 4 can be connected thereto for actuation by a tappet pin 5 extending from a disk 6. A spring 7 can be employed for holding the plunger normally against a stop 8 and during the rotation of disk 6 the pin 5 can be caused to engage the lever 4 and move the plunger at the proper times and over the correct distance.

In line with the guide sleeve 2 is a rotatable nut holder or sleeve 9 to which nut blanks are adapted to be fed one at a time by plunger 3. The holder has a placer 10 of any suitable construction at its inlet end and the interior of the holder is so shaped that a nut when positioned in the holder will be compelled to rotate therewith but can slide therein. The placer 10 serves to guide the nut blanks into the rotating holder as they are moved forwardly by the plunger.

Supported in the holder 9 is a tap 11 having a stem 12 which extends straight from the holder or sleeve 9 and merges into an arcuate end portion 13 which extends laterally as shown.

A table 14 is slidably mounted on guide rods 15 and 16 and springs 17 on these rods serve to hold the table normally pressed back from the holder or sleeve 9. The table is inclined downwardly toward the holder or sleeve 9 and has an arcuate guide channel 18 in its upper surface in which the arcuate portion 13 of stem 12 is centered. This groove is so porportioned that a series of nuts mounted on the stem will be held against rotation and with their side faces in sliding contact with the walls of the channel 18. This channel is of depth greater than the diameter of the nuts. Consequently a restraining strip 19 can be fastened across the end portions of the channel and will act to hold the stem in place.

Located at the inlet end of channel 18 is a placer 20 in the form of a stepped or toothed tongue so located that when the corner portion of a nut comes thereagainst the nut will be deflected so as to enter the channel 18 in proper position and without becoming caught on the ends of the walls thereof.

Any desired mechanism can be used for actuating the parts. For example, the sleeve or holder 9 can be provided with a gear 21 for receiving motion through a gear 22 from a shaft 23. Table 14 can be operated by a lever 24 one arm of which is operatively connected to the table while the other arm is engaged and actuated by a cam 25. By means of suitable mechanism indicated generally at 26 the cam 25 and disk 6 can be operated in properly timed relation.

In practice the sleeve or holder 9 is continuously rotated. A nut blank is pushed into the inlet end of the sleeve or holder 9 and before the plunger 3 begins its return stroke the table 14 is fed forwardly and forces the end of the tap against and into the nut blank. As this blank is rotating with the sleeve or holder 9 a thread will be started and immediately thereafter the plunger returns to its starting position while the rotating blank will feed along the tap until the threading operation is completed.

Each nut N as it is threaded, is delivered onto stem 12 and is pressed backwardly by the next succeeding nut until a series of threaded nuts are strung on the stem. As the nuts are delivered from the rotating sleeve or holder 9 they will be brought to different relative positions on the stem with their corners out of alinement as shown at 27 in Figures 1 and 2. Obviously, therefore, some means must be employed for adjusting the nuts so that they can be fed into channel 18 and slide therein with their corners properly alined so that they will not bite into or wedge between the walls of the channel. It is for this purpose that the placer 20 is used.

As each nut reaches the outlet end of the channel it will drop from the stem into a container, not shown.

What is claimed is:

1. A rotatable nut holder, means for feeding blanks thereto intermittently, a non-rotatable tap in the holder, a stem projecting therefrom, and having an arcuate portion, a reciprocatory table having a nut guiding channel in which the stem is seated, said stem constituting means for receiving threaded nuts from the tap, and means between the table and the holder for adjusting the nuts angularly to place them for entry into the channel.

2. A reciprocatory member having a guide channel for receiving nuts and holding them against rotation, a non-rotatable tap, a stem extending therefrom having an arcuate portion within the channel, means for rotating nut blanks on the tap to thread them and deliver them to the stem, and a nut placer at the inlet end of the channel.

3. A reciprocatory member having a guide channel for the reception of a sliding series of nuts, the walls of the channel constituting means for holding the nuts against rotation, a non-rotatable tap, a stem extending therefrom within the channel, means for rotating blanks on the tap to thread them and deliver them to the stem, and means for adjusting the nuts on the stem for unrestrained entry to the channel.

4. A reciprocatory member having a guide channel for receiving nuts and holding them against rotation, a non-rotatable tap, a stem extending therefrom having an arcuate portion within the channel, means for rotating nut blanks on the tap to thread them and deliver them to the stem, and a nut placer at the inlet end of the channel and movable with the reciprocating member.

5. A reciprocatory member having a guide channel for receiving nuts and holding them against rotation, a non-rotatable tap, a stem extending therefrom having an arcuate portion within the channel, means for rotating nut blanks on the tap to thread them and deliver them to the stem, and a means at the inlet end of the channel and movable with the reciprocatory member for alining nuts on the stem for unrestrained entry to the channel.

6. A rotatable nut holder, means for feeding blanks thereto intermittently, a channeled member mounted for reciprocation relative to the holder, a non-rotatable tap in the holder having a laterally curved stem in the channel, and means extending between the holder and member and actuated by said member for rotating threaded nuts on the stem to place all of the nuts on said member in the same position relative to the member thereby to uniformly support the stem and move freely along the stem and member.

In testimony that I claim the foregoing as my own, I have hereto affixed my signature.

WILLIAM L. CLOUSE.